United States Patent [19]

Ueno

[11] Patent Number: 4,932,259
[45] Date of Patent: Jun. 12, 1990

[54] PIEZOELECTRIC PHYSICAL QUANTITY DETECTOR

[75] Inventor: Sadayasu Ueno, Katsuta, Japan

[73] Assignee: Hitachi, Ltd., Tokyo, Japan

[21] Appl. No.: 347,657

[22] Filed: May 5, 1989

[30] Foreign Application Priority Data

May 9, 1988 [JP] Japan ................................. 63-110533

[51] Int. Cl.$^5$ ............................................. G01P 15/10
[52] U.S. Cl. .................................. 73/517 AV; 310/329
[58] Field of Search .......... 73/517 AV, 517 B, 517 R, 73/510, 505; 310/329

[56] References Cited

U.S. PATENT DOCUMENTS

| | | | |
|---|---|---|---|
| 3,033,043 | 5/1962 | Runft | 73/517 AV |
| 3,233,466 | 2/1966 | Shaw | 310/329 |
| 4,409,836 | 10/1983 | Comroe et al. | 73/505 |
| 4,694,696 | 9/1987 | Hojo et al. | 73/505 |

OTHER PUBLICATIONS

"Capacitive Transducers", by T. L. Foldvari et al., Instruments & Control Systems, pp. 77-85, Nov. 1964.

*Primary Examiner*—Tom Noland
*Assistant Examiner*—Louis M. Arana
*Attorney, Agent, or Firm*—Antonelli, Terry, Stout & Kraus

[57] ABSTRACT

A piezoelectric detector for detecting a physical quantity comprising, a piezoelectric device having a first electrode and a second electrode for modulating a carrier A.C., signal a excitation power source for supplying the carrier A.C. signal to the first electrode so as to excite the piezoelectric device, a weight mechanically coupled to the piezoelectric device so as to add the physical quantity to the piezoelectric device, an A.C. amplifier for amplifying a modulated output from the second electrode, and a demodulator for demodulating an amplified output from the A.C. amplifier. The piezoelectric detector measures the physical quantity while having a very low frequency range which D.C. includes.

10 Claims, 2 Drawing Sheets

PIEZOELECTRIC PHYSICAL QUANTITY DETECTOR

BACKGROUND OF THE INVENTION

This invention relates to a detector for detecting a physical quantity such as motion and stress by use of a piezoelectric device and more particularly to a driving system of a piezoelectric detector capable of measuring signals of physical quantities having a low frequency range including D.C.

Conventionally, a piezoelectric device has been used as a detector of acceleration vibration. In Japanese Patent Laid-open No. 62-81572 (1987), for example, detection can be made down to a low frequency by providing for polarization in parallel with a main plane of the piezoelectric. As another prior art example, Japanese Patent Laid-open No. 61-270665 (1986) makes it possible to detect the acceleration down to a low frequency by use of a center fixed type piezoelectric device.

However, the conventional technique stated above has a fatal drawback in that measurement of the frequency component of the acceleration to the D.C. is impossible. Electrical charges generated by stress applied to the piezoelectric device leak because the impedance between the electrodes of the device is finite.

SUMMARY OF THE INVENTION

An object of the present invention is to furnish a piezoelectric detector which makes it possible to measure a signal of a physical quantity such as motion and stress in a detection range of low frequency including D.C. by use of a piezoelectric device.

The above object is attained by using a device for exciting in advance a piezoelectric device by a carrier A.C. signal in a physical quantity detector composed of a piezoelectric device, a weight coupled mechanically to the piezoelectric device and means for taking the output signal obtained at the electrodes of the piezoelectric device in association with a physical quantity such as stress or momentum (e.g. acceleration, speed, displacement) applied to the weight. The output signal is subjected to amplitude-modulation, the carrier which is modulated by the physical quantity is then demodulated and the output signal associated with the physical quantity is removed.

Therefore, in the present invention, as the charges generated by the stress applied to the piezoelectric device are changed to positive or negative according to the carrier A.C., the charge does not leak from the electrode of the piezoelectric device and can be amplified and taken out in the frequency range of very low frequency including D.C.

DETAILED DESCRIPTION OF THE REFERRED EMBODIMENTS

Hereinafter, embodiments of the present invention will be described with reference to the drawings.

Figure 1:
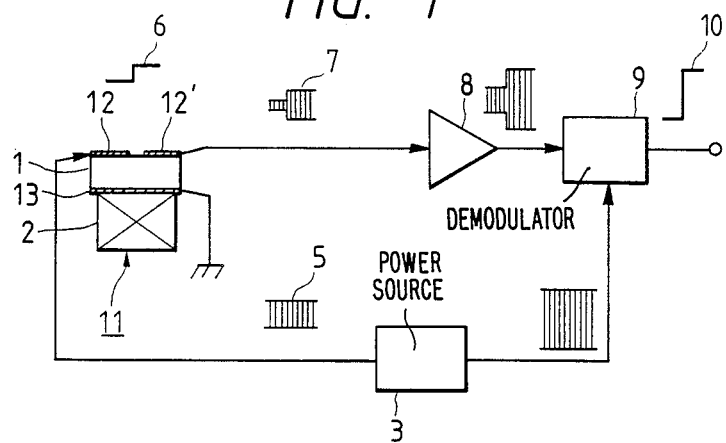
FIG. 1 is a block wiring diagram showing an embodiment of the present invention.

FIG. 1 shows a first embodiment of an acceleration detector. A detection unit 11 is formed by a disc-like piezoelectric device 1, opposed electrodes 12, 12' and 13, and a weight 2 which is mechanically coupled with the device 1 through the electrode 13. A carrier A.C. voltage 5 is applied to the electrode 12 from an excitation power source 3. An acceleration step signal 6 occurring between the opposed electrodes 12 and 13 of the piezoelectric device modulates the carrier A.C. so as to generate a modulated output signal 7 from the electrode 12', and is amplified by an A.C. amplifier 8 and thereafter is detected synchronously by a demodulator 9. The amplified acceleration step signal 10 is then obtained from the demodulator.

In FIG. 1 the electrode 12 is separated from the electrode 12', but if the electrode 12 is connected to the electrode 12' as one electrode, the operation is the same as that of the embodiment in FIG. 1.

Figure 2:
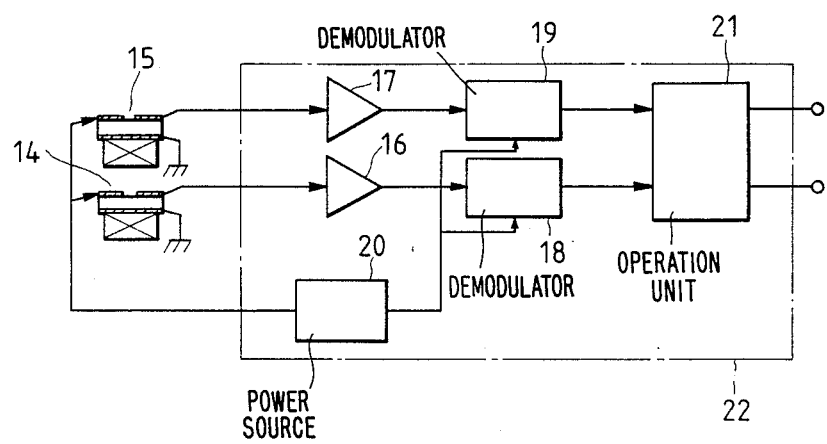
FIG. 2 is a block wiring diagram showing an another embodiment of the present invention.

FIG. 2 shows another embodiment wherein two systems of acceleration detectors are fitted to a body of a vehicle in order to determine the vector of motion of the vehicle on a real time basis from the acceleration components in the moving direction of the vehicle and the direction thereto. This apparatus can be used, for example, for determining the angle of inclination of a slope and a horizontal component of a car speed when the vehicle travels on the slope at a low speed or for determining the angle of inclination of the car body and the car speed relative to the ground when abrupt acceleration/deceleration is made on a horizontal road. In the drawing, reference numerals 14 and 15 represent the acceleration detection units in the moving direction of the vehicle and in the direction perpendicular thereto, respectively, 16 and 17 are A.C. amplifiers, 18 and 19 are demodulators and 20 is an excitation power source, which is used in common for the two systems of acceleration detectors. Reference numeral 21 represents an operation unit for operating the output signal levels of the two systems, whereby the inclination angle of the slope, the inclination angle of the vehicle and the car speed to the ground are determined. Reference numeral 22 in the drawing represents schematically the state where the driving circuit portions of the two systems of the acceleration detectors and the operational processing units of the output signals are disposed on a common substrate.

Figure 3:
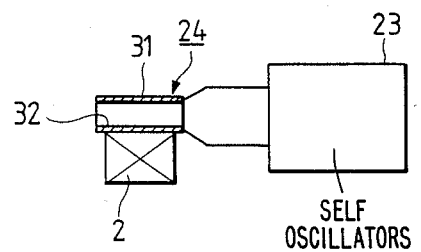
FIG. 3 is a block wiring diagram showing another embodiment of the present invention using a selfoscillator.

FIG. 3 shows another embodiment for converting the change of acceleration to the change of the oscillation frequency by use of the piezoelectric device having electrodes 31, 32 as a capacitance C for determining the oscillation frequency in a self-oscillator such as R-C oscillator. This is based on the phenomenon that the capacitance between the electrodes changes when stress due to the acceleration is applied to the piezoelectric device. In this case, it is preferred to set the oscillation frequency to a broader side than an audible frequency band so as eliminate offensive noise and to near to a resonance point so as to improve detection sensitivity. The change of the oscillation frequency may be supplied as an analog signal of the acceleration by use of an F-V converter. In the drawing, reference numerals 23 represents the self-oscillators and reference numeral 24 represents the detection unit including the piezoelectric device.

Figure 4:
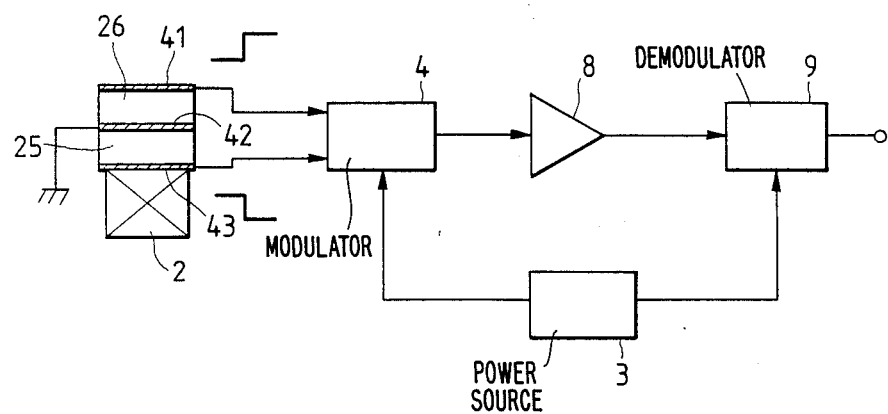
FIG. 4 is a block wiring diagram showing still another embodiment of the present invention.

In FIG. 4, two piezoelectric devices 25, 26 of the same kind having electrodes 41, 42 and 43 are coupled mechanically to the weight 2 and are connected to the modulator 4 which modulate carrier A.C. voltage from a power source 3. An amplifier 8 amplifies outputs from the modulator 4 in the same way as in FIG. 1 so that their outputs are amplified mutually complimentarily. In the drawing, the outputs of the piezoelectric devices 25, 26 have the polarities as shown in the drawing.

This embodiment can offset temperature dependence of the two piezoelectric devices by connecting them complimentarily.

As described above, the present invention can measure the frequency detection range of physical quantities such as motion and stress down to the D.C. component. Though using a simple driving circuit construction, the present invention can not only detect economically the physical quantities at a plurality of positions but can also provide a detector which is highly resistant to disturbance such as an electro-magnetic interference.

I claim:

1. A piezoelectric detector comprising:
   a piezoelectric element having a first electrode and a second electrode;
   a excitation power source for supplying an A.C. carrier to the first electrode so as to excite the piezoelectric device;
   a weight mechanically coupled to the piezoelectric element, wherein motion of the weight modulates the A.C. carrier in the piezoelectric element according to at least one of acceleration, velocity and displacement of the weight;
   an A.C. amplifier for amplifying a modulated output from the second electrode; and
   a demodulator for demodulating an amplified output from the A.C. amplifier.

2. A piezoelectric detector according to claim 1 further comprising:
   means for connecting the first electrode to the second electrode.

3. A piezoelectric detector according to claim 1 wherein
   said piezoelectric element modulates an amplitude of the A.C. carrier.

4. A piezoelectric detector according to claim 1 wherein
   said demodulator demodulates the amplified output from the A.C. amplifier by using the A.C. carrier supplied from the excitation power source.

5. A piezoelectric detector according to claim 1 wherein
   a frequency of said A.C. carrier is greater than an audio frequency.

6. A piezoelectric detector according to claim 1 wherein
   a frequency of said A.C. carrier is substantially equal to a resonance frequency of the piezoelectric element.

7. A piezoelectric detector comprising:
   a plurality of piezoelectric elements each having a first electrode and a second electrode;
   an excitation power source for supplying an A.C. carrier to the first electrode of each of the plurality of piezoelectric elements so as to excite the plurality of piezoelectric elements,
   a plurality of weights mechanically coupled respectively to each of the plurality of piezoelectric elements, wherein motion of the plurality of weights modulates the A.C. carrier in the piezoelectric element according to at least one of the acceleration, velocity and displacement of the plurality of weights;
   a plurality of A.C. amplifiers for respectively amplifying modulated outputs from the second electrodes, and
   a plurality of demodulators for respectively demodulating amplified outputs from the plurality of A.C. amplifiers.

8. A piezoelectric detector according to claim 7 further comprising:
   means for respectively connecting the first electrode of each of the plurality of piezoelectric elements to the second electrode of each of the plurality of piezoelectric elements.

9. A piezoelectric detector according to claim 7 wherein
   said plurality of piezoelectric elements respectively modulate an amplitude of the A.C. carrier.

10. A piezoelectric detector according to claim 7 wherein the motion of the plurality of weights modulates the A.C. carrier in each of the plurality of piezoelectric elements according to a plurality of respective first vectors of at least one of the acceleration, velocity or displacement of each of the plurality of weights and a plurality of second vectors which are perpendicular components of each of the plurality of first vectors.

* * * * *